Sept. 16, 1958   G. S. ELLIS   2,852,281
FLUID PRESSURE COUPLING WITH WEDGED SEALING SLEEVES
Filed March 9, 1955
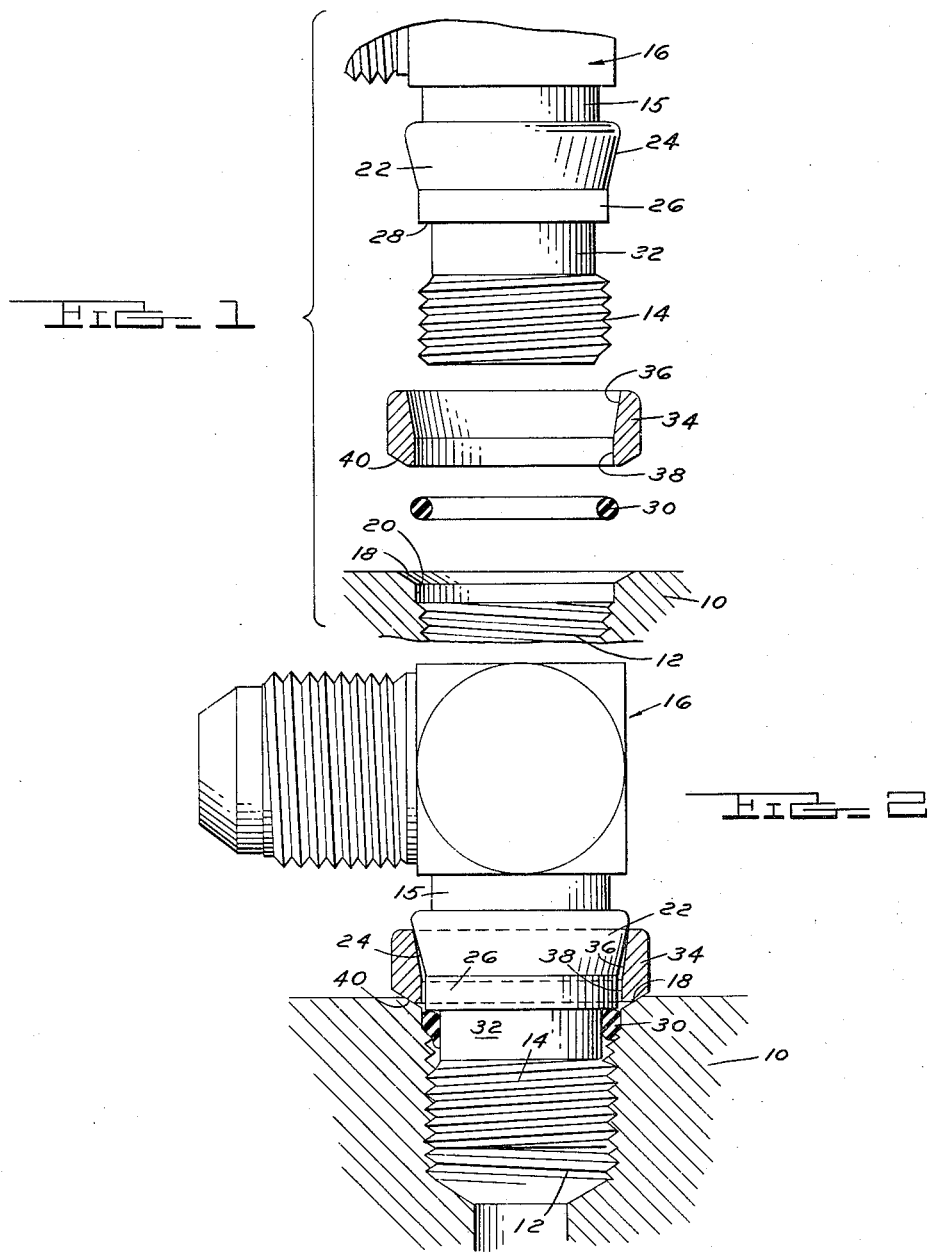
INVENTOR.
GEORGE S. ELLIS
BY
Burton & Parker
ATTORNEYS United States Patent Office 2,852,281
Patented Sept. 16, 1958

2,852,281

FLUID PRESSURE COUPLING WITH WEDGED SEALING SLEEVES

George S. Ellis, Fraser, Mich., assignor, by mesne assignments, to L & L Manufacturing Company, East Detroit, Mich., a corporation of Michigan Application March 9, 1955, Serial No. 493,115

3 Claims. (Cl. 285—89)

This invention relates to couplings for fluid pressure systems.

Heretofore it has been the practice in locking a straight threaded fitting in a straight threaded port, as distinguished from a tapered threaded port, to provide a lock nut which is threaded down the fitting to bear against the member provided with the port and thereby lock the fitting in the port. Such lock nut prevents accidental rotation or loosening of the fitting after it has been threaded into the port. It also serves as a means for tightening the fitting in the port, because with a straight threaded fitting and port the threads themselves will not tension the fitting in the port.

One disadvantage of these lock nuts is that they require the fitting to be threaded in two different places, first, at the end of the fitting where it is threaded into the port, and, second, at a point spaced from such end and adapted to receive the threads of the lock nut. The common practice is to provide two spaced apart sets of threads, with a smooth portion of the fitting intermediate the sets adapted to be encircled by an O-ring gasket to seal the fitting against the gasket. Variations of this arrangement are widespread. However, this double set of threads, and the threaded lock nuts themselves, increase the cost of the coupling.

Another disadvantage of this arrangement is that the O-ring gasket is frequently chewed up in the threads of the lock nut as it is tightened down around the port with the result that the O-ring seal is destroyed.

An object of the invention is the provision of a coupling for use with a member having a straight threaded port, and which coupling includes a fitting that is threaded into the port with improved means for locking the fitting in determined adjusted positions in the port, with such improved means being both simple in construction and inexpensive to manufacture and which obviates the possibility of chewing up the O-ring gasket and destroying the seal thereof.

Another object of the invention is the provision in a coupling of the character mentioned of an annular shoulder on the fitting which tapers upwardly and outwardly and with which shoulder a collar or tension ring received over the fitting cooperates to urge the lower edge of the collar tightly down upon the ported member in which the fitting is threaded to lock the fitting in a determined adjusted position in the port.

Another object of the invention is the provision in the coupling of the character mentioned of a resistingly distortable or expansible collar or sleeve which is received over the fitting and is tensioned thereagainst and against the ported member in which the fitting is threaded, with the collar being sufficiently expansible or distortable during the threading of the fitting into the port so that the fitting may be positioned in a plurality of determined adjusted positions of rotation in the port and the collar will lock the fitting in such positions to prevent accidental loosening or turning of the fitting.

Another object of the invention is the provision in a coupling of the character mentioned of a gasket trapping surface on the annular tapering shoulder, which surface is adapted to trap a gasket encircling the fitting below such surface in the port into which the fitting is threaded.

Other objects, advantages, and meritorious features will more fully appear from the specification, claims, and accompanying drawing, wherein:

Fig. 1 is an exploded view of a coupling embodying my invention; and

Fig. 2 is a view of my improved coupling partially in section, and showing the coupling with the parts in assembled relationship.

Shown in Fig. 1 is a member 10, in the threaded port 12 of which is adapted to be received the threaded end 14 of one leg 15 of a fitting 16. The member 10 may be any component of a fluid pressure system to which it is desired to couple the fitting 15. The threads of the fitting at 14 and of the member 10 are straight threads as distinguished from tapered threads. The mouth of port 12 may be tapered as at 18. The port may also be provided with a gasket receiving wall portion 20 between the taper 18 and the threads of the port.

Spaced above the threaded end 14 of the fitting is an annular shoulder 22 tapering upwardly and outwardly as at 24 away from the threaded end of the fitting. The shoulder 22 may be an integral part of the leg 15 of the fitting. I have found that a taper of substantially 12 degrees is satisfactory. Just below the taper 24 the shoulder exhibits a cylindrical portion 26, the radially extending lower edge 28 of which forms a gasket retaining or trapping surface for the O-ring gasket 30. The diameter of cylindrical portion 26 is less than the diameter of the gasket seating wall portion 20 of the port, so that the lower end of the portion 26 may be received in the upper end of the seating portion 20, as shown in Fig. 2. That portion of leg 15 of the fitting intermediate the shoulder 22 and the threads 14, and indicated at 32, is a smooth wall portion which is adapted to be encircled by the O-ring gasket 30. This smooth wall portion 32 and the edge 28 of the shoulder form the sealing surfaces of the fitting against which the O-ring gasket bears when the fitting is tightened into the port as shown in Fig. 2.

Removably received over leg 15 of the fitting for shiftable movement thereon is a tension ring 34. The ring may be formed of a resistingly distortable or expansible material such as steel or brass, depending upon the pressure that the coupling must withstand. The tension ring is internally tapered at 36, with the taper having an angular inclination of substantially 10 degrees from the axis of the ring. It will be noted that this inclination of the taper 36 is different from the 12-degree inclination of taper 24 of the shoulder. The reason for this is pointed out hereinafter. Just below the taper 36, the ring is provided with an internal cylindrical surface 38 which is of a slightly greater diameter than the diameter of the portion 26 of the shoulder, as shown in Fig. 2. At the lower edge of the ring it is externally chamfered as at 40, with the angular inclination of the chamfer being of the same degree as the inclination of the tapered mouth 18 of port 12. I have found that the taper here is satisfactory if substantially 60 degrees with respect to the axis of the port and the ring.

The operation of the coupling is as follows. The tension ring is first slipped over leg 15 of the fitting and disposed in abutment with the taper of shoulder 22. Then the O-ring gasket 30 is rolled over threaded end 14 of the fitting and into position on smooth wall portion 32 and in abutment with the lower edge 28 of the shoulder. The threaded end 14 of the fitting is then introduced into the port and threaded thereinto until a handtight position is reached. The fitting is then further threaded into the port by torquing with a wrench.

In Fig. 2 the fitting is shown in a wrench-tight, locked, and sealed position in the port. The O-ring gasket 30 has been squeezed as shown between the seating portion 20 of the port and the edge 28 and smooth wall 32 of the fitting to form a tight seal. The lower chamfered edge of the tension ring is in abutment with the tapered mouth of the port and the internal taper 36 of the ring is in cooperative abutment with the tapering surface 24 of the shoulder. Because of the difference in the inclination of the tapered surfaces 24 and 36, when the fitting is threaded into the port to a hand-type position, a line contact is made between the ring and the fitting. Upon further wrenched threading of the fitting into the port, tapering surfaces 24 and 36 cooperate to spring or expand the ring outward slightly at its upper edge and simultaneously force it down against the tapered mouth 18 of the port. During such slight outward expanding of the ring at its upper edge, the lower edge of the ring is held against outward expansion by the tapered mouth of the port and chamfered edge of the ring. As a result the ring tends toward distortion and the internal tapering bore 36 thereof assumes a position more nearly juxtaposing the tapered surface 24 of the shoulder. If the fitting is tightened down into the port with sufficient torquing force, the tapering surfaces 24 and 36 may be urged together throughout a substantial portion of their axial dimension.

As the ring is stretched or expanded outwardly at its upper edge it is also tensioned more tightly about the shoulder 22 and the area of contact between the tapering surface 24 of the shoulder and the tapering surface 36 of the ring increases. With such increase in the contact area between the shoulder and the ring, an increased torquing force is required to either further tighten or loosen the fitting in the port. As a consequence, after the fitting has been threaded down into the port so that the tension ring 34 has been expanded at its upper edge and tensioned about the shoulder, the fitting is locked in position in the port against accidental rotation or loosening. I have found that the ring may be so tensioned about the shoulder and against the tapered mouth 18 of the port that a satisfactory seal is effected by the tension ring alone to the exclusion of the O-ring gasket.

The lower gasket trapping edge 28 of the shoulder prevents the O-ring from being extruded upwardly out of the port, and if the O-ring does extrude beyond edge 28, the tension ring 34 will prevent any further extrusion.

What I claim is:

1. A fluid pressure coupling comprising: a member provided with a threaded port and a counterbore adjacent to the entrance to the port and having a chamfered mouth, a fitting threaded at its lower end to be threadedly received in the port, said fitting provided with an annular shoulder spaced above the threaded portion by a cylindrical portion, said annular shoulder having a cylindrical face portion adjacent to the end closest to the threaded end of the fitting and having a tapered face portion extending upwardly and outwardly away from the cylindrical face portion toward the opposite end of the fitting, a sleeve shiftably received over the fitting and shiftably encircling the shoulder and provided with an internal annular tapering face opposed to the tapering face of the shoulder, said faces abutting adjacent to the upper edge of the sleeve when the fitting is threaded into said member, the internal surface of said sleeve adjacent the lower end thereof being normally spaced radially outwardly from the cylindrical face portion of the shoulder, said sleeve having an outwardly upwardly chamfered lower end received within the chamfered mouth of the counterbore of said member, whereby upon threading of the fitting into said member the sleeve is wedged between the tapered face portion of the shoulder and the chamfered mouth of the counterbore of said member and is sprung radially outwardly adjacent its upper edge to grippingly encircle the tapered face of the shoulder with the lower end of the sleeve held against expansion within said counterbore, said cylindrical face portion of the shoulder having a smaller external diameter than the internal diameter of the counterbore of the member and a compressible gasket received about the cylindrical portion of the fitting adjacent to the shoulder and adapted to be compressed by the shoulder within the space between the face of the counterbore of the member and the opposed cylindrical portion of the fitting.

2. A fluid pressure coupling comprising: a member provided with a threaded port and a counterbore adjacent to the entrance to the port and having a chamfered mouth, a fitting threaded at its lower end to be threadedly received in the port, said fitting provided with an annular shoulder spaced above the threaded portion by a cylindrical portion, said annular shoulder having a cylindrical face portion adjacent to the end closest to the threaded end of the fitting and having a tapered face portion extending upwardly and outwardly away from the cylindrical face portion toward the opposite end of the fitting, a sleeve shiftably received over the fitting and shiftably encircling the shoulder and provided with an internal annular tapering face opposed to the tapering face of the shoulder, said faces abutting adjacent to the upper edge of the sleeve when the fitting is threaded into said member, the internal surface of said sleeve adjacent the lower end thereof being normally spaced radially outwardly from the cylindrical face portion of the shoulder, said sleeve having an outwardly upwardly chamfered lower end received within the chamfered mouth of the counterbore of said member, whereby upon threading of the fitting into said member the sleeve is wedged between the tapered face portion of the shoulder and the chamfered mouth of the counterbore of said member and is sprung radially outwardly adjacent its upper edge to grippingly encircle the tapered face of the shoulder with the lower end of the sleeve held against expansion within said counterbore, said cylindrical face portion of the shoulder terminating in a radial face adjacent to the cylindrical portion of the fitting and having a smaller external diameter than the internal diameter of the counterbore of the member, and a compressible gasket received about the cylindrical portion of the fitting adjacent to the radial face of the shoulder and adapted to be compressed by the shoulder within a space between the face of the counterbore of the member and the opposed cylindrical portion of the fitting, said internal tapered face portion of the sleeve being tapered on a lower angle than the angle of the tapered face portion of the shoulder.

3. A fluid pressure coupling comprising: a fitting threaded at its lower end and provided with an annular shoulder above the threaded portion, said annular shoulder having an upwardly and outwardly tapered face portion lying on an angle of less than 45 degrees with respect to the axis of the fitting, a continuous resilient sleeve shiftably received over the fitting and shiftably encircling the shoulder and provided with an internal annular tapering face opposed to the tapering face of the shoulder and of a slightly less angle of taper than the angle of taper of said face portion of the shoulder and of an internal diameter at its upper end less than the maximum outside diameter of the tapering face portion of the shoulder, said sleeve having an external outwardly and upwardly chamfered lower end lying on a taper of more than 45 degrees with respect to the axis of the sleeve, a member provided with a threaded port having a chamfered mouth at the entrance of the port with the angle of taper of the chamfered mouth being substantially the same as that of the external annular chamfered lower end of the sleeve, said sleeve being squeezed between the shoulder and the tapering mouth of the port when the fitting is threaded into the port with the tapering face portion of the shoulder springing the upper end of the sleeve radially outwardly while the tapering mouth of the port urges the lower end of the sleeve radially inwardly, thereby tending to twist the sleeve through a couple action, said sleeve being internally spaced from the fitting throughout its axial length except at the point of expanding contact with the shoulder at the upper end of the sleeve, said sleeve contractible radially inwardly under the influence of said couple action to continuously sealingly grip the tapering face portion of the shoulder upon slight elongation of the fitting under the influence of fluid pressure, and tendency of the lower end of the sleeve to expand under the influence of fluid pressure between the sleeve and the fitting effecting a camming action between the chamfered mouth of the port and the external taper at the lower end of the sleeve to urge the sleeve upwardly against the tapering face portion of the shoulder to tighten the grip of the sleeve about the shoulder.

References Cited in the file of this patent

UNITED STATES PATENTS

| | | |
|---|---|---|
| 358,443 | Findley | Mar. 1, 1887 |
| 2,394,097 | Parker | Feb. 5, 1946 |
| 2,413,878 | Maky | Jan. 7, 1947 |

FOREIGN PATENTS

| | | |
|---|---|---|
| 317,163 | Great Britain | Aug. 15, 1929 |